United States Patent
Daffey

(10) Patent No.: US 8,216,008 B2
(45) Date of Patent: Jul. 10, 2012

(54) MIXED PROPULSION SYSTEM

(75) Inventor: Kevin Daffey, Chepstow (GB)

(73) Assignee: Rollys-Royce PLC, London (GB)

( * ) Notice: Subject to any disclaimer, the term of this patent is extended or adjusted under 35 U.S.C. 154(b) by 422 days.

(21) Appl. No.: 12/310,979

(22) PCT Filed: Oct. 8, 2007

(86) PCT No.: PCT/GB2007/003803
§ 371 (c)(1),
(2), (4) Date: Mar. 26, 2009

(87) PCT Pub. No.: WO2008/043989
PCT Pub. Date: Apr. 17, 2008

(65) Prior Publication Data
US 2009/0215328 A1    Aug. 27, 2009

(30) Foreign Application Priority Data
Oct. 13, 2006 (GB) .................... 0620447.3

(51) Int. Cl.
| B63H 21/20 | (2006.01) |
| B63H 21/06 | (2006.01) |
| B63H 21/16 | (2006.01) |
| B63H 21/17 | (2006.01) |
| B63H 23/24 | (2006.01) |
| H02J 3/38  | (2006.01) |

(52) U.S. Cl. ..................... 440/3; 440/4; 440/6
(58) Field of Classification Search .............. 440/3–6
See application file for complete search history.

(56) References Cited

U.S. PATENT DOCUMENTS
| 4,417,878 A | * | 11/1983 | Koren .................... 440/3 |
| 5,199,912 A | * | 4/1993 | Dade et al. ............. 440/6 |
| 2004/0262924 A1 | | 12/2004 | Wacker |

FOREIGN PATENT DOCUMENTS
| DE | 2237400 A | * | 2/1974 |
| EP | 0 536 876 A1 | | 4/1993 |
| EP | 0 730 333 A2 | | 9/1996 |
| EP | 1 022 218 A2 | | 7/2000 |
| GB | 1159090 | | 7/1969 |
| GB | 2445382 A | * | 7/2008 |
| JP | 04046892 A | * | 2/1992 |

OTHER PUBLICATIONS

"The diesel-electric power/propulsion system of the USCG icebreaker 'Healy'", MER Marine Engineers Review, Apr. 1995, pp. 42-43, London, Great Britain.
"Diesel electric versus diesel mechanical", MER Marine Engineers Review, May 1993, pp. 42 & 44, London, Great Britain.
Feb. 11, 2010 Search Report issued in PCT/GB2007/003803.
Feb. 11, 2010 Written Opinion issued in PCT/GB2007/003803.

* cited by examiner

*Primary Examiner* — Ajay Vasudeva
(74) *Attorney, Agent, or Firm* — Oliff & Berridge, PLC

(57) ABSTRACT

A mixed propulsion system for a seagoing vessel such as a liquid natural gas carrier including a gas turbine engine is described. The vessel has at least one electric propulsion drive and a plurality of prime movers of different types each coupled directly to drive an electrical generator. The outputs of the several generators are connected to at least two electricity distribution switchboards to supply the power requirements of the vessel, and each electric propulsion drive is cross-coupled to receive power selectively from either switchboard such that in the event of a single failure in a switchboard or prime mover or both power can be maintained to both propulsion drives.

4 Claims, 5 Drawing Sheets

MIXED PROPULSION SYSTEM

BACKGROUND

The invention concerns a mixed propulsion system for a seagoing vessel.

In particular the invention relates to a power management arrangement for a ship propulsion system having a mix of prime movers that is several prime movers powered from several different fuel sources. Ship operators require flexible and efficient propulsion plant that is able to accommodate a range of ship operating profiles and speeds, and to be capable of delivering sufficient power on demand in all situations. A number of power sources operating on different fuels are available, each having its individual advantages and weaknesses.

A marine power system is required to meet a number of challenges: it must be capable of meeting ship power requirements at all times and in all conditions, but ship owners and operators also demand economic operation, to be able to meet environmental legislation and economy of cargo space. The instantaneous power demand varies throughout the different stages of a voyage. In port and loading cargo where propulsion is not required the system has to meet a demand comprising the ship's domestic requirement and that of its cargo handling equipment. Maneuvering at low speed when leaving and entering moorings, harbours etc. the propulsion system requires a potentially wide range of power demand levels which may change in an instant. Whereas at sea the power demand may remain more or less constant for many hours or even several days at cruise speeds.

SUMMARY

Steam turbine propulsion plant is used in great numbers in the current shipping fleet due to available high power output combined with the possibility of using low grade fuels, and low maintenance costs with high reliability. However, its efficiency is not as good as other power sources, hence fuel consumption is high and responsiveness to power demand changes can be relatively slow. Diesel engines are more efficient and are able to respond rapidly to power demand changes. Gas turbine engines are best suited to continuous operation at high outputs since they are not as responsive as diesel engines for rapid load changes but are lighter and smaller than other prime movers.

The use of electric drives, where the propeller shaft is driven by an electric motor, has made it possible to install several prime mover/generator sets to supply the power requirement and to choose the prime mover best suited to the prevailing conditions. Prime mover/generator sets may be located within the ship hull at positions of choice rather than their location being dictated by the constraints of a mechanical connection to the propeller shaft (s). However this places emphasis on the design and layout of the electricity distribution system to ensure that the system is fault tolerant while ensuring continuity of supply at all times. The present invention is intended to meet these criteria.

According to the present invention there is provided a mixed propulsion and power system for a seagoing vessel comprising at least one electric propulsion drive, a plurality of prime movers of different types each coupled directly to drive an electrical generator, the outputs of the generators are connected to at least two electricity distribution switchboards to supply the power requirements of the vessel, and each electric propulsion drive is cross-coupled to receive power selectively from either switchboard such that in the event of a single failure in a switchboard or prime mover or both power can be provided to the propulsion drives.

Preferably the plurality of prime movers comprises gas turbine, steam turbine and diesel engines.

BRIEF DESCRIPTION OF THE DRAWINGS

A practical example of how the present invention may be carried into practice will now be described with reference to the figures of the accompanying drawings, in which.

DETAILED DESCRIPTION OF THE EMBODIMENTS

Referring now to the figures of the drawings, there is illustrated in diagrammatic form a prime-mover line-up for a liquid natural gas (LNG) carrier ship utilising a combined gas turbine, electric and steam (COGES) power station. In the figures of the accompanying drawings, like parts carry like references.

Liquid natural gas is transported as a cryogenic liquid, consequently it is in a constant state of boiling, and the boil-off gas must be vented from the cargo space or re-compressed and returned to the cargo container. In order to manage the cargo cryogenic equipment is run continuously to maintain a low cargo temperature and to re-compress boil-off gas and pump it back into the cargo tanks. However, since it is a source of fuel, some or all of the boil-off gas may be consumed by the vessel prime movers. Large LNG carriers utilise duel fuel prime movers, including gas turbines, capable of consuming cargo boil off gas (BOG) or traditional, bunkered liquid diesel fuel. Gas turbine propulsion provides a robust, environmentally friendly and economic solution for LNG ships. However, gas turbines are not the most efficient and cost-effective solution in all operating conditions, and a mix of prime movers is considered desirable to provide a well-balanced continuous supply to meet all power needs.

The power requirement for all the additional, auxiliary equipment of cryogenic pumps and other equipment is high and substantially constant. For large ships, such as an LNG carrier, the propulsion system power requirement is also high and is substantially constant for long periods, an environment for which a gas turbine is ideally suited. Natural gas is a suitable fuel for gas turbine engines and is ideally suited to make use of at least a proportion of the cargo boil-off gas. New developments in diesel engine technology have resulted in dual-fuel capability enabling ship-borne diesels to be run on either natural gas or more conventional fuel oil. However, the choice of fuel and, in the case of LNG carriers at least, means that the ship can utilise cargo boil-off gas and reduce the quantity of bunkered fuel carried. It is further proposed that energy in the hot turbine exhaust is recovered via a steam turbine coupled to an electric generator connected to the electric distribution system.

Figure 1:
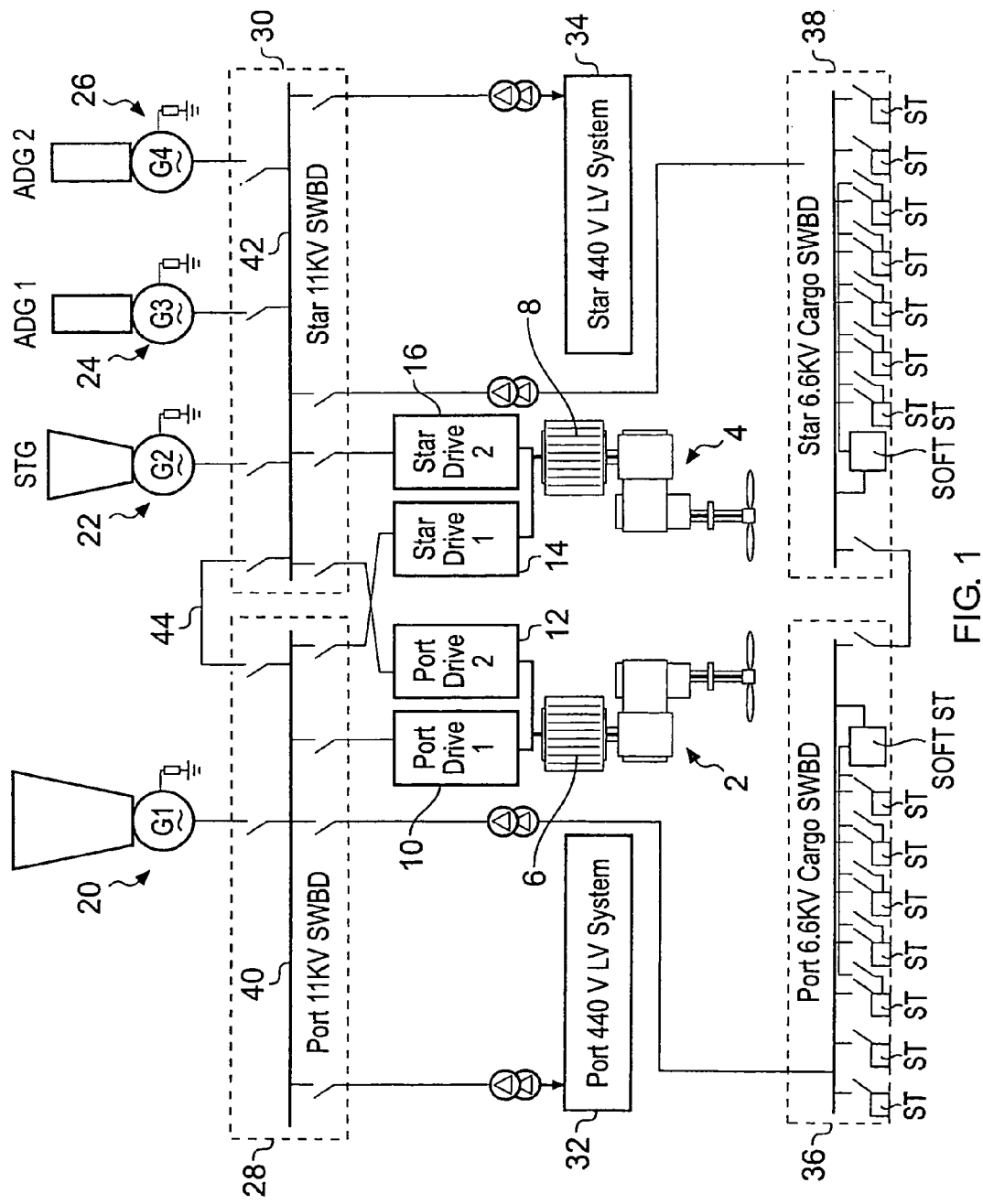
FIG. 1 is a diagrammatic illustration of the line up of prime movers of a large vessel.

In accordance with the present invention FIG. 1 shows a line-up of prime movers and alternator/generators suitable for a large container vessel (not shown) especially one designed specifically for the transport of LNG. The vessel has two electrically driven propulsion systems generally indicated at 2, 4 designated port and starboard. Each of the electric motors 6, 8 respectively has duplicate electric supply control/switching arrangements. The port drive motor receives power either through power electronic converters "port drive unit 1" referenced 10 in the drawings or through power electronic converters "port drive unit 2" referenced 12. The starboard drive motor 8 receives power either through power electronic converters "starboard drive unit 1" referenced 14 in the drawings or through power electronic converters "starboard drive unit 2" referenced 16.

The line-up of prime movers comprises a gas turbine alternator combination 20, a steam turbine alternator 22 and two auxiliary diesel alternators 24, 26. In the example described the generators produce electricity at 11 kV, the invention is not exclusive to the generator output voltage and may be adopted in conjunction with an alternative standard voltage of 13.8 kV or higher. In accordance with the invention a proposed configuration of prime movers and electrical power system is suitable to meet the requirements of LNG carriers. The gas turbine alternator 20 is adapted to run on boil-off gas or liquid diesel fuel. The steam turbine alternator 22 may be run using heat from the gas turbine exhaust to generate steam through a heat recovery steam generator, or by using an auxiliary fired boiler generating steam into the same steam plant. This boiler can be fired using boil-off gas or liquid fuel. The two auxiliary diesel generators 24, 26 that complete the line-up, in this example, are also capable of being run on either boil-off gas or liquid fuel.

The prime-mover alternator combination provides all of the electrical needs of the vessel. The generator outputs are connected to a main electrical distribution arrangement comprising a pair of electric distribution switchboards 28, 30. In the drawings these switchboards 28, 30 are referred to as a port switchboard, labelled Port SWBD, and a starboard switchboard, labelled Star SWBD. respectively. All loads, including propulsion, thrusters, auxiliaries and ship systems are normally fed from this grid, and the total load may be supplied by one prime mover/generator set or shared between the running generators. The voltage level of the power plant is selected according to the total power requirements of the vessel, and the technical limits of the equipment. Generally in line with higher power level requirements a higher power generating voltage is chosen. So, for example in systems having a total installed power level in the range 8-10 MW and above the generating plant is designed to deliver electrical output at 11 kV. Typically ship systems and auxiliaries are chosen to operate at 6.6 kV and accommodation/domestic requirements at 440V. In the drawings the non-propulsion electric loads are represented schematically as follows; a port low voltage (440v) 32 load supplied from the port switchboard 28; a starboard low voltage (440v) 34 load supplied from the starboard switchboard 30; a port medium voltage (6.6 kv) load 36 supplied from the port switchboard 28, and a starboard medium voltage (6.6 kv) load 38 supplied from the starboard switchboard 30. Each of the loads is represented schematically but is to be understood to include power transformer means to step down the primary supply voltage from the switchboard/generator voltage of 11 kv to either 6.6 kv or 440v consumer distribution voltage as appropriate.

Power distribution to the port and starboard propulsion motors 6, 8 is arranged such that both motors may be driven selectively through either of their respective power electronic converters 10, 12 for the port motor and 14, 16 for the starboard motor. power electronic converters 10 and 14 are connected to receive electric power at 11 kV from the port switchboard 28, and power electronic converters 12 and 16 are connected to receive electric power from the starboard switchboard 30. Thus, power may be maintained to both propulsion motors should either switchboard 28 or 30 be put out of action. This cross connection of supplies to the port and starboard propulsion system drives minimises the possibility that switchboard and prime-mover failures could prevent both propulsion shafts being supplied with power.

Power outputs from the prime mover/generator sets 20, 22, 24 and 26 are connected to bus bars 40, 42 that form the basis of switchboards 28, 30 respectively. The electrical output from the gas turbine driven generator 20, in the arrangement illustrated, is connected to bus bar 40 in the port switchboard 28. The electric outputs from the steam turbine driven generator 22, and the two diesel driven generators 24 26 are connected to the bus bar 42 of switchboard 30.

The port loads 32, 36 are arranged to be connected to the bus bar 40, and the starboard loads 34, 38 are arranged to be connected to the bus bar 42 in the starboard switchboard 30. The bus bars 40, 42 may be coupled together as indicated by connecting link 44. All of the generator outputs, all of the loads and the propulsion power electronic converters are coupled to their respective bus bars through circuit breakers so that any combination of generators and loads can be selectively connected and supplied.

Figure 2:
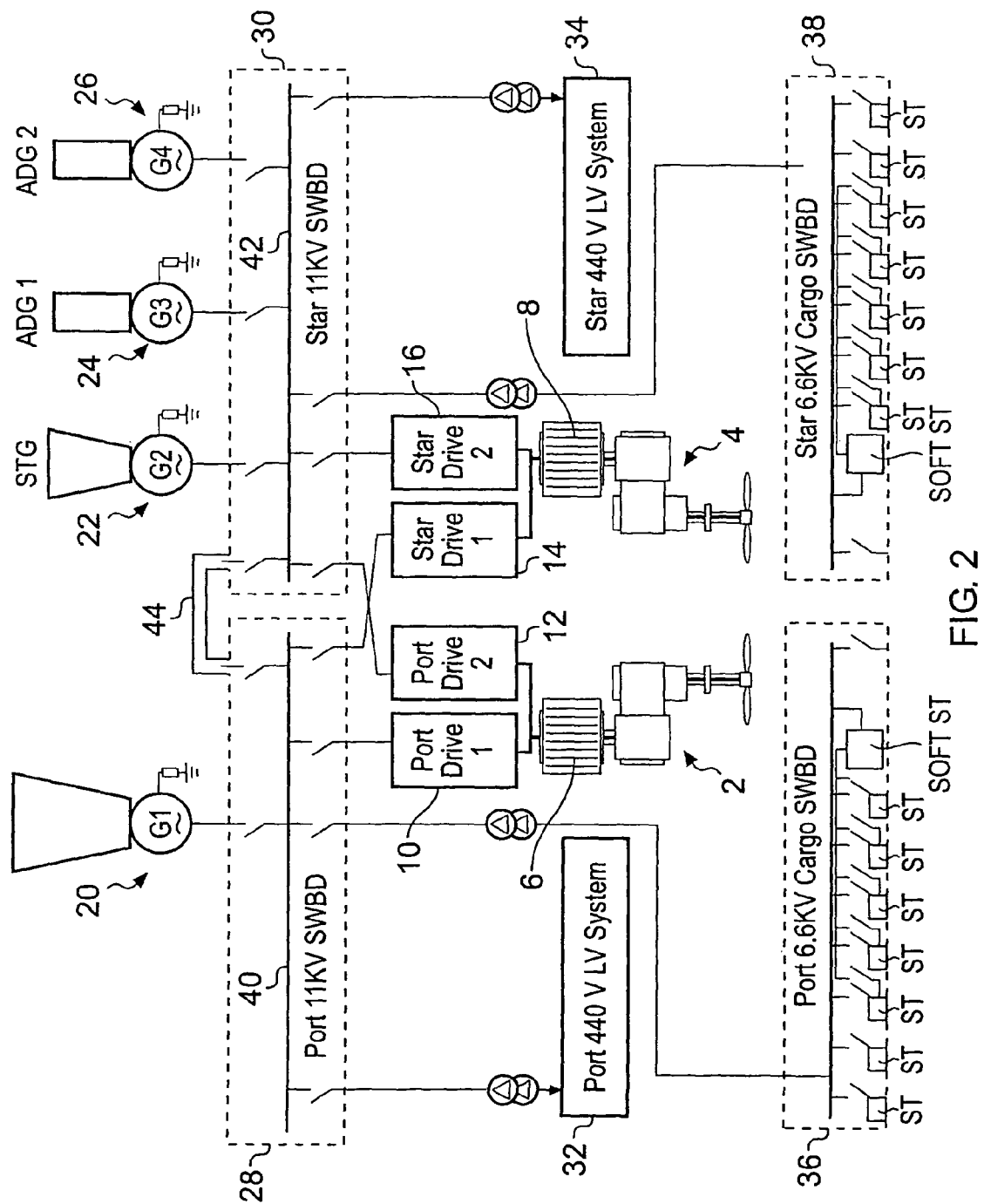
FIG. 2 illustrates how the prime movers of FIG. 1 would be operated in accordance with the invention when the vessel is in port and loading cargo.

FIG. 2 illustrates the power system configuration when in port and loading cargo. One or both auxiliary diesel generators 24, 26 are on-line to provide power to the electrical network.

Figure 3:
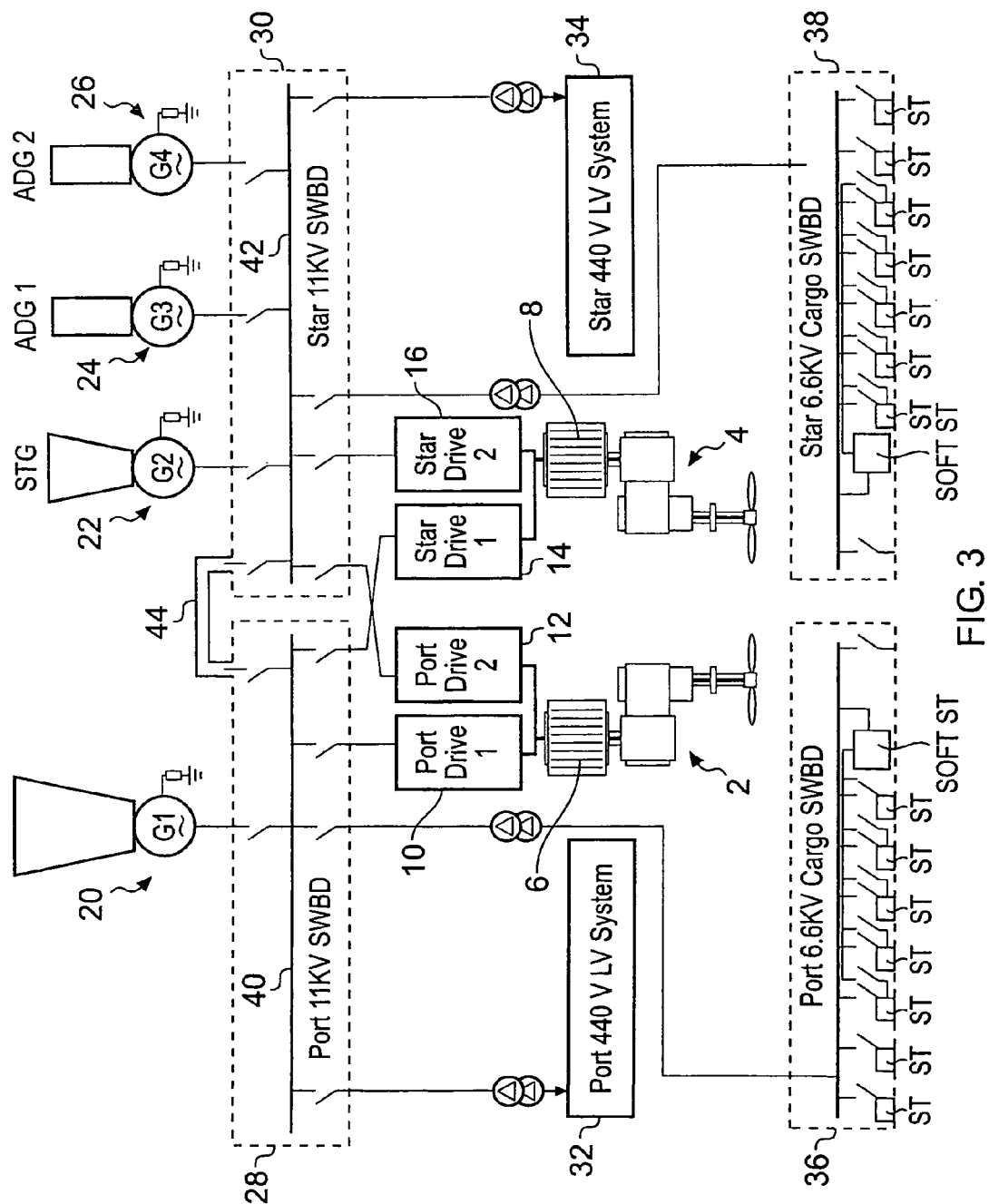
FIG. 3 illustrates how the prime movers of FIG. 1 would be operated in accordance with the invention when the vessel is getting underway, leaving port and maneuvering in confined waters.

FIG. 3 illustrates the power system configuration when the ship is underway and leaving port, the electrical system is configured to generate power from the gas turbine alternator 20 fuelled by BOG and the auxiliary fired boiler fuelled by BOG is used to create steam for the steam turbine alternator 22. In this configuration the electrical system is configured as a single bus and the link 44 is closed. The system in this configuration is resilient to single-points of failure. No single prime-mover trip will cause loss of propulsion or degradation of maneuvering speed (assumed to be about 10 knots). In addition, the prime movers are configured ready for the voyage configuration. For slow speed maneuvering in confined waters, for example in the Suez Canal then the configuration is the same as FIG. 3. This prime-mover configuration is resilient to a single prime-mover failure and allows for propulsion power to be maintained up to 10 knots.

Figure 4:
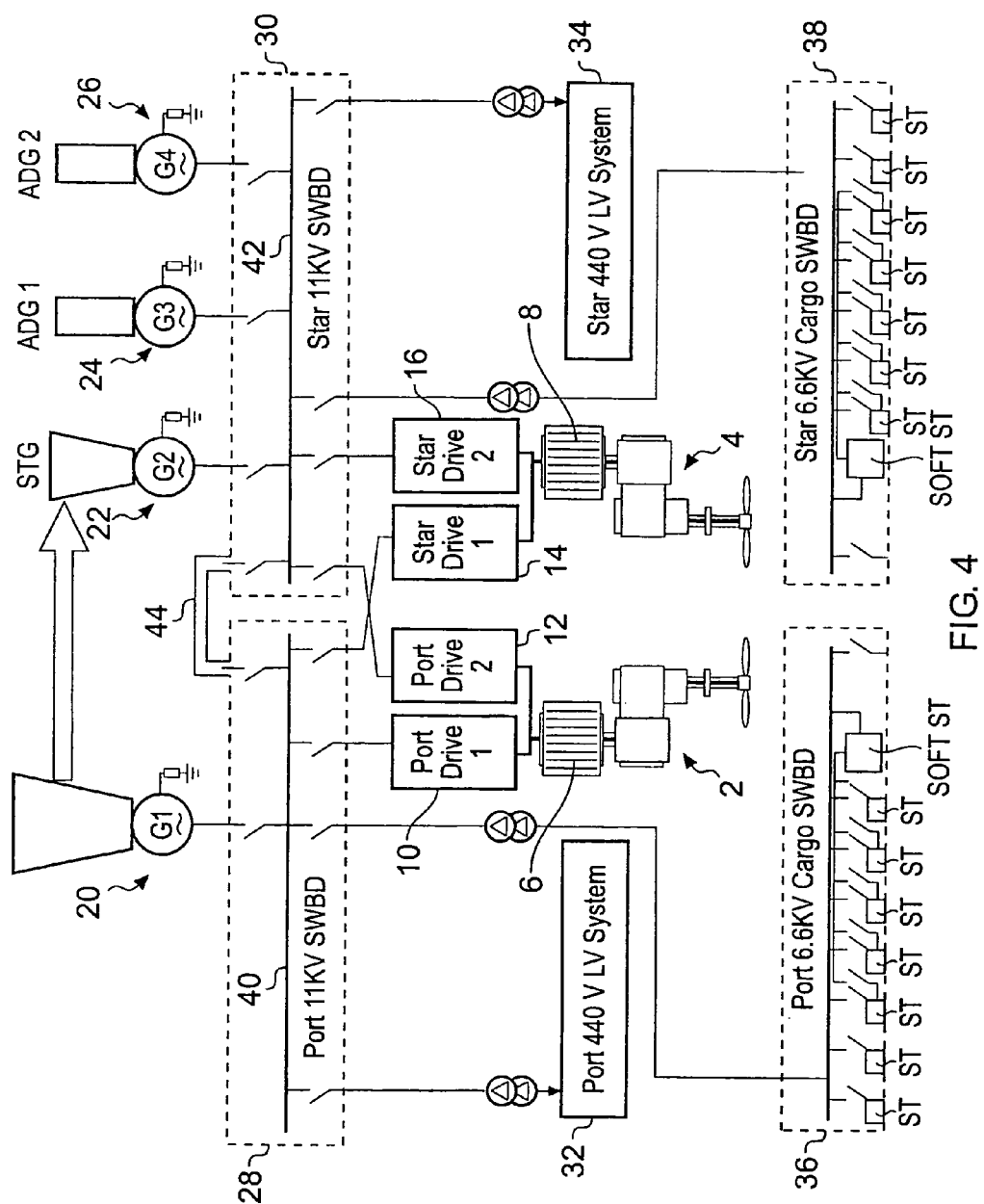
FIG. 4 illustrates how the prime movers of FIG. 1 would be operated in accordance with the invention in voyage configuration.

FIG. 4 illustrates the power system configuration in the voyage configuration. The auxiliary fired boiler is switched off and the gas turbine exhaust provides heat to the steam generator as indicated at 46 to generate steam for the steam turbine alternator 22. This is a very economic mode of operation with very high thermal efficiency in comparison with simple-cycle gas turbine or diesel electric propulsion configurations.

Figure 5:
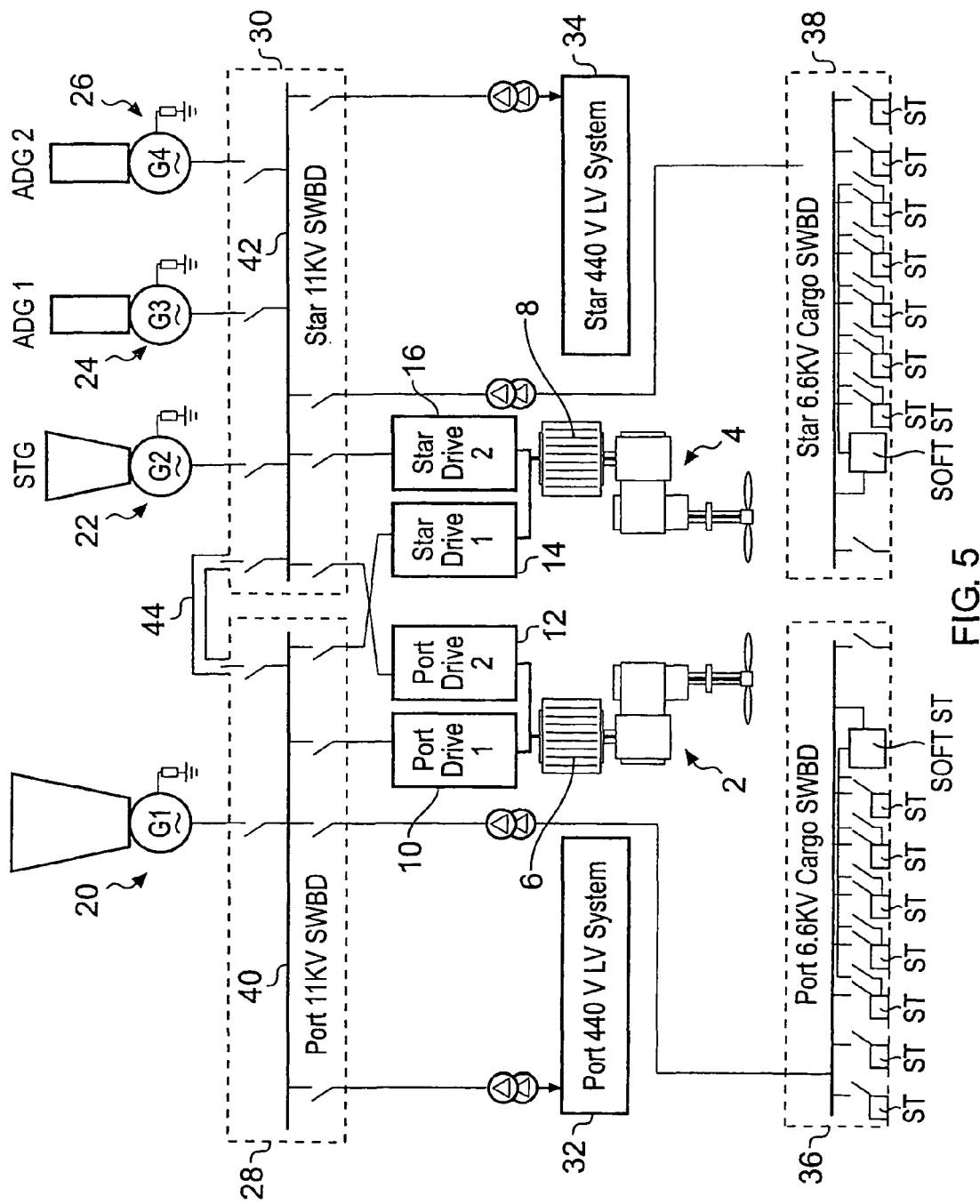
FIG. 5 illustrates how the prime movers of FIG. 1 would be operated in accordance with the invention when the vessel is entering port and preparing to load or unload cargo.

FIG. 5 illustrates the power system configuration for entry into port for loading or unloading LNG cargo then the configuration. This configuration of a gas turbine alternator 20 and two diesel generators 24, 26 is resilient to any single prime-mover failure and allows safe maneuvering speed to be maintained at all times. In addition the steam generation and steam alternator system 22 is safely shutdown for port duties.

Electric power is supplied in port by diesel generators 24, 26 only and therefore seamless transition to in port configuration is assured by this line-up.

The invention claimed is:

1. A mixed propulsion system for a seagoing vessel comprising:
    two electric propulsion drives, each electric propulsion drive further comprising two electric control systems, wherein each control system is connected to receive electrical power from respective first and second electricity distribution switchboards;
    a gas turbine engine coupled directly to drive an electrical generator to supply electrical power to the first switchboard;
    a steam turbine engine and two diesel engines, wherein the steam turbine engine and the two diesel engines are each coupled directly to drive a respective electrical generator to supply electrical power to the second switchboard;
    the first and second switchboards being adapted to supply the power requirements of the vessel; and
    each propulsion drive is cross-coupled to receive power selectively from the first or second switchboard such that operation of a pre-determined arrangement of the gas turbine engine, the steam turbine engine and the diesel engines provides electrical power to both propulsion drives, and in the event of a single failure in a switchboard or an engine or both, the supply of electrical power to both propulsion drives can be maintained.

2. The mixed propulsion system for the seagoing vessel as claimed in claim 1, wherein hot exhaust gas from the gas turbine engine is utilized to generate steam in the steam turbine engine.

3. The mixed propulsion system for the seagoing vessel as claimed in claim 1, wherein a fuel for at least the gas turbine engine is natural gas.

4. The mixed propulsion system for the seagoing vessel as claimed in claim 3, wherein the natural gas is boil-off gas from the vessel's cargo.

* * * * *

UNITED STATES PATENT AND TRADEMARK OFFICE
CERTIFICATE OF CORRECTION

| | | |
|---|---|---|
| PATENT NO. | : 8,216,008 B2 | Page 1 of 1 |
| APPLICATION NO. | : 12/310979 | |
| DATED | : July 10, 2012 | |
| INVENTOR(S) | : Kevin Daffey | |

It is certified that error appears in the above-identified patent and that said Letters Patent is hereby corrected as shown below:

Title Page, Item (73) Assignee
"Rollys-Royce PLC, London (GB)"

Should read

--Rolls-Royce PLC, London (GB)--

Signed and Sealed this
Twenty-fifth Day of September, 2012

David J. Kappos
*Director of the United States Patent and Trademark Office*